(12) United States Patent
Kerin et al.

(10) Patent No.: US 8,240,716 B2
(45) Date of Patent: Aug. 14, 2012

(54) QUICK CONNECTOR COUPLING WITH PULL TAB VERIFIER

(75) Inventors: Jim Kerin, Gross Pointe Woods, MI (US); Richard M. Pepe, Macomb, MI (US)

(73) Assignee: TI Group Automotive System, LLC, Auburn Hills, MI (US)

( * ) Notice: Subject to any disclaimer, the term of this patent is extended or adjusted under 35 U.S.C. 154(b) by 407 days.

(21) Appl. No.: 12/534,418

(22) Filed: Aug. 3, 2009

(65) Prior Publication Data

US 2010/0032937 A1    Feb. 11, 2010

Related U.S. Application Data

(60) Provisional application No. 61/087,024, filed on Aug. 7, 2008.

(51) Int. Cl.
*F16L 35/00* (2006.01)
*F16L 37/14* (2006.01)
(52) U.S. Cl. .............................. 285/93; 285/82; 285/321
(58) Field of Classification Search .................... 285/82, 285/87, 93, 321
See application file for complete search history.

(56) References Cited

U.S. PATENT DOCUMENTS

| | | | |
|---|---|---|---|
| 5,152,555 A | 10/1992 | Szabo | |
| 5,863,077 A | 1/1999 | Szabo et al. | |
| 5,897,145 A * | 4/1999 | Kondo et al. | 285/93 |
| 6,145,886 A * | 11/2000 | Ohta et al. | 285/4 |
| 7,484,774 B2 | 2/2009 | Kerin et al. | |
| 7,497,477 B2 | 3/2009 | Pepe | |
| 7,806,213 B2 * | 10/2010 | Inoue et al. | 180/69.4 |
| 2003/0160448 A1 * | 8/2003 | Takayanagi | 285/305 |
| 2003/0218335 A1 * | 11/2003 | Takayanagi | 285/319 |
| 2006/0285917 A1 * | 12/2006 | Pepe | 403/321 |

* cited by examiner

*Primary Examiner* — James Hewitt
(74) *Attorney, Agent, or Firm* — Leydig, Voit & Mayer, Ltd.

(57) ABSTRACT

A quick connector coupling for use with a fluid line includes a connector body defining a through bore extending from a male reception end of the connector body. The connector body is adapted to operably receive a male member extending through the male reception end of the connector body into the bore. A retainer is releasably coupled to the connector body. The retainer is movable relative to the connector body from an unlatched position to the latched position only when the male member is fully inserted into the body. A separable indicia element is releasably engaged to the retainer and is removable from the retainer only when the retainer is in the latched position.

13 Claims, 5 Drawing Sheets

QUICK CONNECTOR COUPLING WITH PULL TAB VERIFIER

CROSS-REFERENCE TO RELATED APPLICATIONS

This patent application claims the benefit of U.S. Provisional Patent Application No. 61/087,024, filed Aug. 7, 2008, which is incorporated herein in its entirety by reference.

FIELD OF THE INVENTION

This disclosure relates to fluid line systems which include quick connector couplings, and more particularly to a quick connector coupling having a redundant retainer that includes pull tab verification.

BACKGROUND OF THE INVENTION

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and female connector body of a quick connector coupling. One type of retention mechanism involves use of a retainer inserted through slots formed in the exterior of the connector body. Beams extending through the slots are positioned in abutting contact between the male member upset and the rearward surfaces defining the slots to prevent withdrawal of the tube. Such retainers are often referred to as "horseshoe" retainers. Examples of this type of coupling are found in U.S. Pat. Nos. 6,846,021 and 7,390,025. These arrangements include a secondary or redundant latch that provides additional security against unintentional separation and also confirms complete connection during the assembly process.

U.S. Pat. No. 7,390,025 discloses various arrangements of connectors with horseshoe type retainers and a redundant latch/verifier. The specification and drawings of that patent are incorporated by reference herein.

Quick connector couplings such as disclosed in U.S. application for patent Ser. No. 11/411,504, filed Apr. 26, 2006, and published as U.S. 2008/0007053 on Jan. 10, 2008, now issued as U.S. Pat. No. 7,484,774 on Feb. 3, 2009, provide the advantage that in the latched position, the redundant latch/verifier prevents unintentional release of the tube. The redundant latch/verifier is able to independently retain the male member of the tube in the connector body should the primary retainer fail. Such couplings provide the additional benefit that the redundant latch/verifier cannot be moved to its latched position unless the associated tube is in its fully inserted position. Its extended position provides a physical and visual indication that the tube is not fully inserted. The specification and drawings of that application are hereby incorporated into this application by reference.

BRIEF SUMMARY OF THE DISCLOSURE

In one embodiment, the arrangement of the present disclosure provides visual and tactile confirmation of proper insertion of the redundant latch or retainer. When the quick connector coupling is completely assembled, the redundant retainer is fully inserted into the connector body. In certain applications it is difficult to determine whether the connector coupling is completely latched. For example, the location of the device may make visual confirmation difficult. The present disclosure provides a mechanism for tactile recognition that the tube is fully inserted and the primary and redundant retainer positioned in their latched positions to retain the tube-to-body connection.

The mechanism of the present disclosure serves the additional function of providing a separable element removable from the coupling only upon complete connection of the tube, connector body and latching elements. This separable element is a physical indicator of a properly completed connection. It is also useful in vehicle assembly procedures where multiple connections are made. A count of removed separable elements may be employed to assure that all couplings have been properly made.

DETAILED DESCRIPTION OF THE DRAWINGS

The quick connector coupling of the present disclosure is illustrated in connection with a fluid line system. It is shown as a releasable connection between a rigid tube and other fluid carrying components, in particular a flexible hose. However, the coupling has numerous other applications where a fluid tight, but releasable connection is desired, such as connection of rigid elements of a fluid path, whether pressurized, or unpressurized. Examples include automotive vehicle fuel delivery systems or automotive air conditioning systems.

Figure 1:
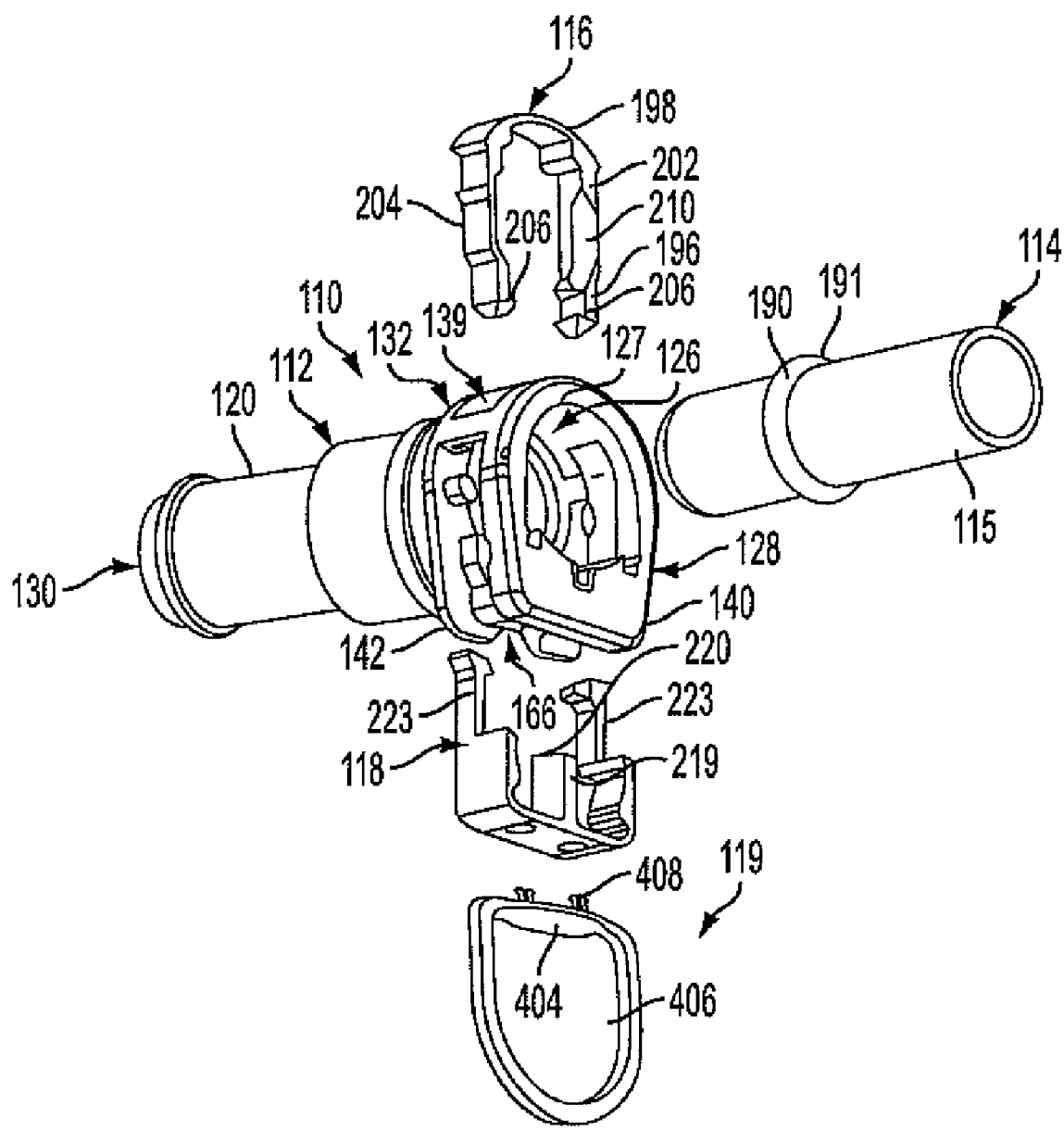
FIG. 1 is an exploded perspective view of a quick connector coupling embodying the principles of the present disclosure.

FIG. 1 illustrates a quick connector coupling 110 for forming a severable connection in a fluid line. The coupling 110 is comprised of a generally cylindrical female connector body 112 and a male member 114, to be releasably secured together by a primary retainer member 116, a redundant latch/verifier member or retainer 118 and a separable indicia element 119.

The redundant retainer member 118 as shown may alternatively be the primary latching mechanism of the quick connector coupling.

In use, the female connector body 112 is connected to a tubing or hose (not shown) which is also a part of the fluid line system. The female connector body 112 and the male member 114 are connectable to form a permanent, but severable, joint in the fluid line.

As illustrated in FIG. 1, the male member 114 is formed at the end of a rigid tube 115. It includes a radially enlarged upset 190 defining a radial abutment surface 191 at a given distance from an open tube end.

Figure 2:
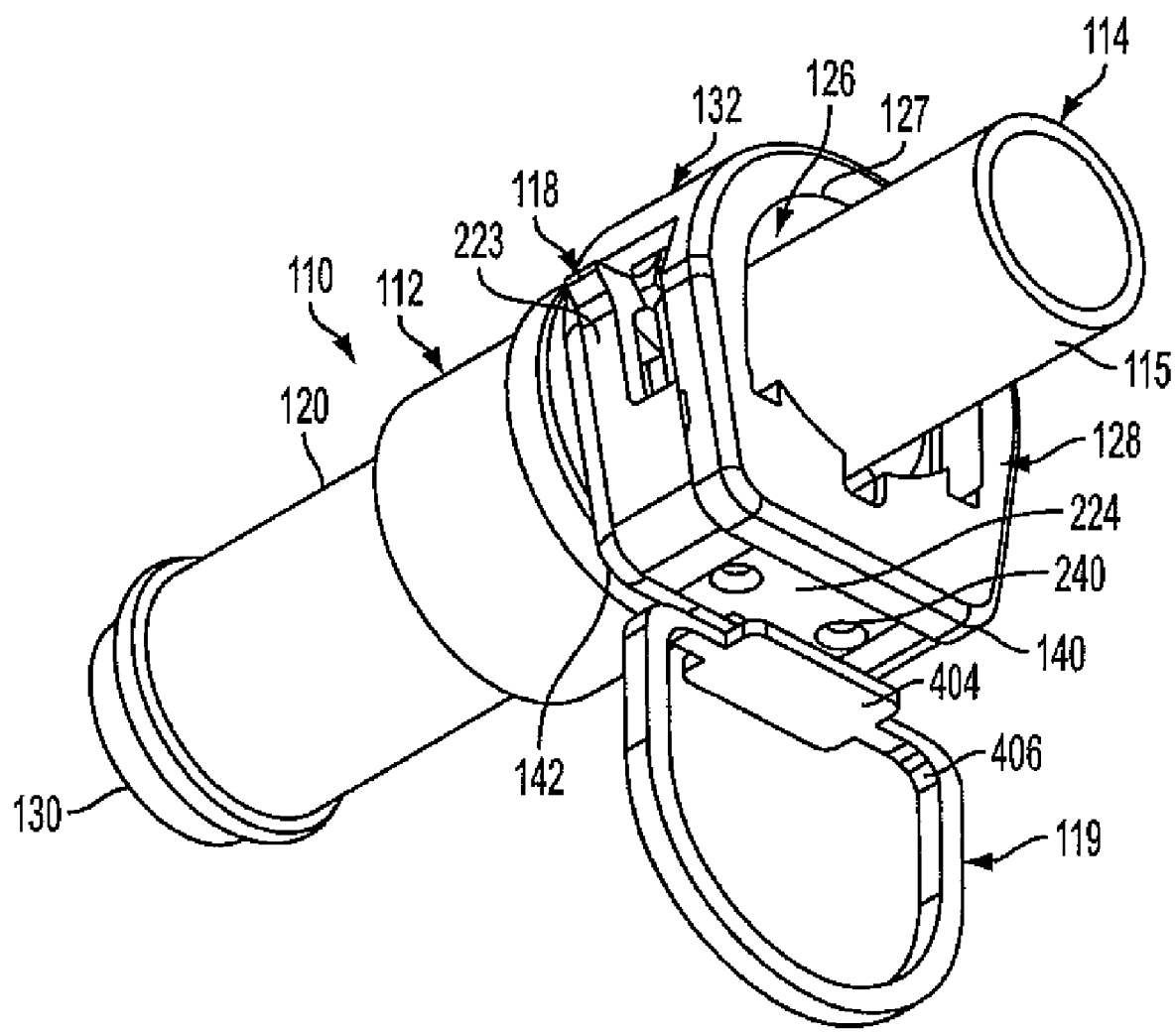
FIG. 2 is a perspective view of the quick connector coupling with the separable element separated from the redundant retainer.

The connector body 112 is illustrated in FIGS. 1 and 2. The connector body 112 is hollow and includes a generally cylindrical wall 120. It must be understood that the body exterior may take any desired shape without departing from the disclosure. It could, for example, include a 90° bend between its ends, which is a common shape for a connector body.

The illustrated connector body 112 is preferably molded of a plastic material, such as polyamide. The connector body could also include a portion made of metal with a separate molded retainer housing attached. Such a configuration is disclosed in U.S. application for patent Ser. No. 11/528,084, published Oct. 11, 2007, as Patent application publication no. US 2007/0236012, now issued as U.S. Pat. NO. 7,497,480 on Mar. 3, 2009, the specification and drawings of which are hereby incorporated herein by reference.

The interior surface of wall 120 defines a through bore 126 from an entrance opening 127 at male member reception end 128 to hose connection end 130. It should be noted that the term axial and axially as used herein means longitudinally along the body wall 120. The terns lateral, laterally, transverse and transversely mean in a plane generally perpendicular to the longitudinal extent of body wall 120.

The bore 126 of connector body 112 extends completely through the connector body 112. Variations in the diameter of wall 120 of connector body 112 divide through bore 126 into distinct sections which include a retainer housing section 132 at the male member reception end 128. It should be noted that the term rearward is used herein to mean in a direction axially from male member reception end 128 toward the hose connection end 130. The term forward means in a direction axially from the hose connection end 130 toward the male member reception end 128.

The retainer housing section 132 is adjacent to the male member reception end 128. It is defined by a forward rim 140. Forward rim 140 is spaced from a rearward rim 142 by a gap or space 139 open to through bore 126. Rims 140 and 142 are connected by an arcuate top support member 144, two side support members 146, two center support members 150, and two bottom support members 154.

It should be noted that for purpose of clarity, the quick connector coupling 110 is shown with its longitudinal extent positioned in a generally horizontal plane and the terms "top," "bottom" and "sides" have been used in describing the connector body 112. It will be understood that the "top" configuration is associated with the primary retainer 116 and the bottom configuration is associated with the redundant retainer 118. However, in use, the connector coupling 110 can reside in any orientation without regard to the horizontal and vertical planes and "top" and "bottom" are only relevant to the illustrations.

The space 139 between the top support member 144 and the two side support members 146 define a pair of top slots 158. The top slots 158 receive and position the legs of the primary retainer 116 transversely of the connector body 112 The space 139 also defines side slots 162 seen in FIGS. 3 to 5.

A pair of parabolic shaped body posts 152, disposed laterally within each side slot 162. These parabolic shaped posts coact with elements of the redundant retainer 118 to maintain it in the unlatched position. A bottom slot 166 leads to a guide slot 161 that receives and positions a beam 219 (shown in FIG. 3) of the redundant retainer 118.

A locking ridge 172 extends laterally in each side slot 162 from each bottom support member 154. The locking ridges engage portions of with the redundant retainer as will be explained.

Figure 5:
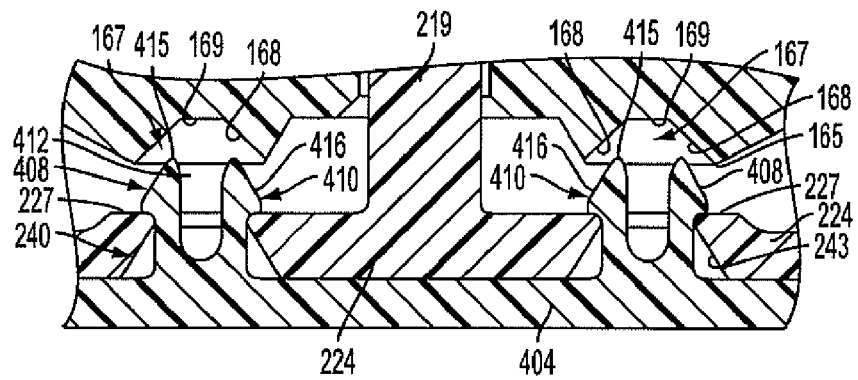
FIG. 5 is a fragmentary sectional view on an enlarged scale of the quick connector coupling as illustrated in FIGS. 3 with the redundant retainer in the unlatched position illustrating details of the quick connector coupling body, redundant retainer and separable indicia element.

Bottom wall surfaces 165 of bottom support members 154 face outwardly between rims 140 and 142. As best seen in FIG. 5, each includes a bore 167 with tapered walls 168 converging radially inwardly to a bottom surface 169. These bores define conical receivers that coact with the separable indicia member or pull ring 119 of the redundant retainer member 118 as will be explained.

The primary "horse-shoe" type retainer 116 is illustrated in FIG. 1. It is preferably molded of a resilient, flexible material, such as plastic. The primary retainer 116, which extends transversely through the top of retainer housing section 132 between rims 140 and 142, is demountably coupled to the connector body 112. It includes a pair of elongated, generally parallel legs 196 having forward faces 202 and rearward faces 204. The legs 196 are joined to and extend from cross member 198. The cross member 198 provides a separation between the legs 196 approximately equal to the outer diameter of the cylindrical tube 115 of male member 114. The arrangement of legs 196 with cross member 198 allows outward expansion of the legs 196 to permit insertion and release of the male member 114 relative to the connector body 112.

Each leg 196 includes a latch 206 formed at an end remote from the cross member 198. When the primary retainer 116 is fully inserted into the connector body 112, the latches 206 contact center support members 150 to retain the primary retainer 116 in position relative to the connector body 112.

Lead areas 210 are formed into the forward faces 202 of legs 196. The areas 210 slope radially inward and axially rearward from the forward face 202 of each leg, and assist in guidance and centering of the male member 114 on insertion into the connector body 112. The rearward surfaces 204 of legs 196 serve as abutment surfaces to abut radial surface 191 of upset 190 to prevent withdrawal of the male member 114 after it is fully inserted.

Figure 3:
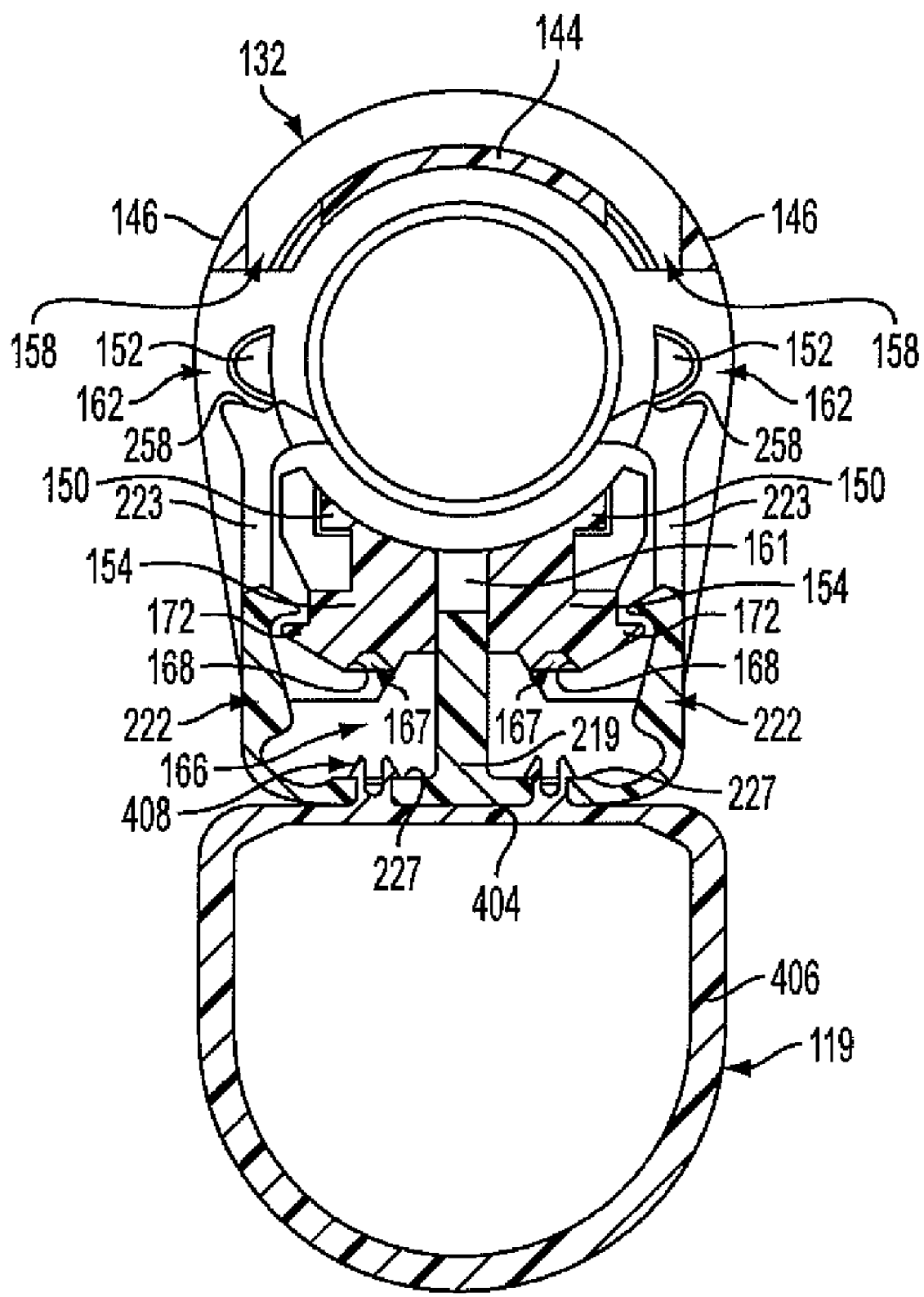
FIG. 3 is a sectional view of the quick connector coupling with the primary latch removed for clarity, and illustrating the unlatched position of the redundant retainer.
Figure 4:
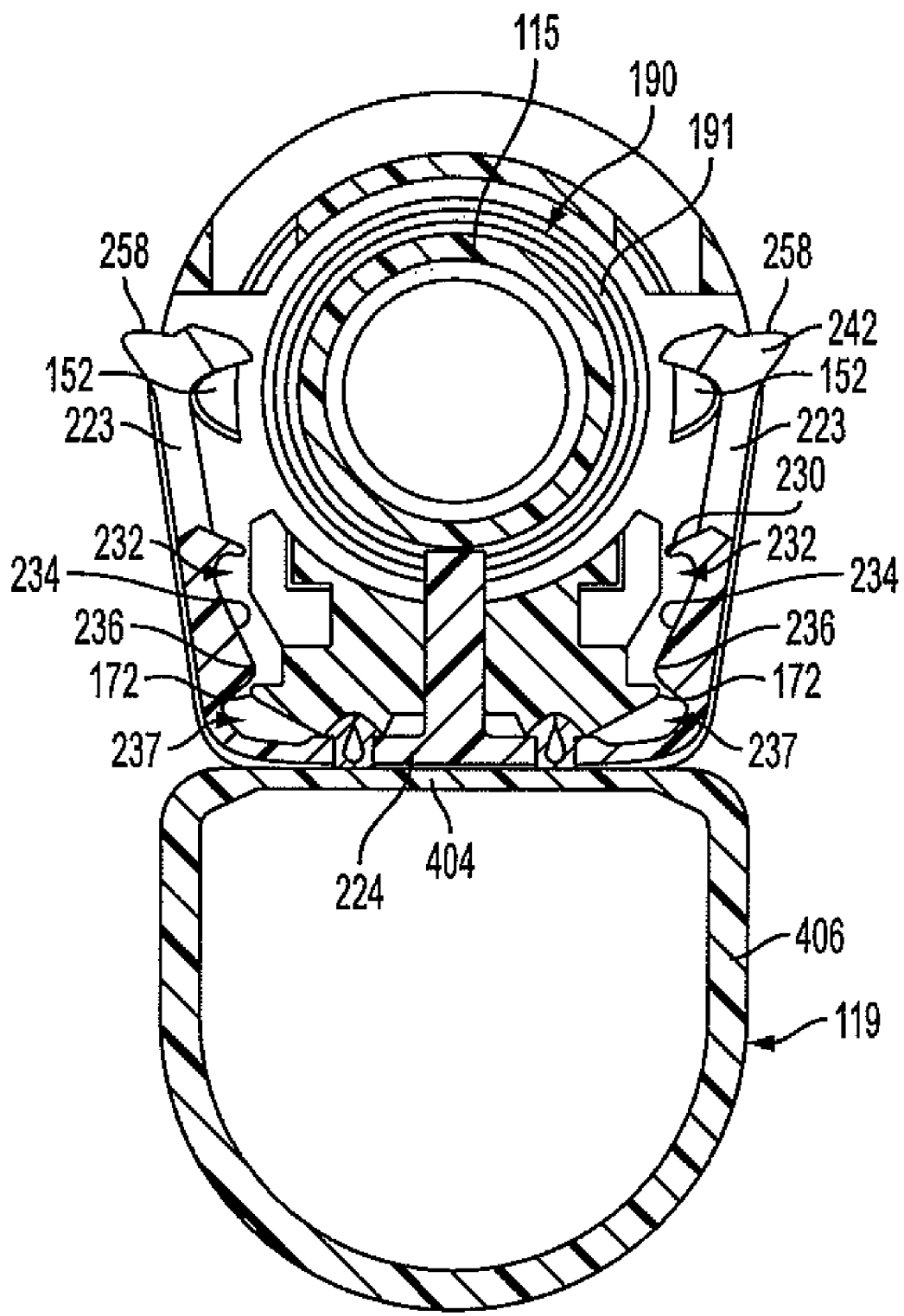
FIG. 4 is a sectional view of the quick connector coupling with the primary latch removed for clarity, illustrating the redundant retainer in the latched position.

The redundant retainer 118 is positioned within the bottom slot 166 and side slot 162 and is demountably coupled to the connector body 112. It is slidable transversely to the body 112, as shown in FIGS. 3 to 5, relative to bottom support members 156 toward and away from the through bore 126 between a radially inner, or latched, position and a radially outer, or unlatched, position.

The retainer 118 includes a connecting member 224 with a radially inward facing surface 227 from which extend retainer beam 219 and a pair of laterally spaced curved generally resilient fingers 222 extending upward from the connecting member 224 and in the same direction as the retainer beam 219. When assembled to the connector body 112, inwardly facing surface 227 generally overlies bottom wall surfaces 165 of bottom support members 154 with retainer beam 219 slidably disposed in bottom slot 166 and fingers 222 residing in side slots 162.

Each finger 222 of redundant retainer 118 includes an extension beam 223 that terminates in a recognition tab 242 at its free or distal end. A locking edge 258 on each extension beam 223 defines a seat for receiving the parabolic central body post 152 when the retainer 118 is in the unlatched position. This engagement restricts movement of the retainer 118 to the latched position absent a male member 114 fully inserted into bore 126.

The recognition tabs 242 sense the presence of upset 190 when the male member 114 is being inserted and uncouple the locking edges 258 from parabolic body posts 152. The recognition tabs 242 of extension beams 223 are free to pass the parabolic central body posts 152 thus permitting retainer 118 to be moved to its latched position.

As best seen in FIG. 4, each finger 222 defines a laterally inward directed hook 230 and nesting areas 232. When in the unlatched position as shown in FIG. 3, the locking ridges 172 defined by the bottom support members 154 reside in nesting areas 232 to releasably secure the retainer 118 to the connector body 112.

Located between the nesting areas 232 of hooks 230 and the connecting member 224, the inner surface of each finger 222 defines a transition surface in the form of a ramped surface 234 and a locking nub 236, enlarged toward the other finger, and retention areas 237. The nesting areas 232 define a space wider than the distance between the locking ridges 172. The ramped surfaces 234 taper toward each other and are smaller than the distance between the locking ridges 172 of the connector body bottom support members 154 at the locking nubs 236. The distance between the laterally enlarged locking nubs 236 is less than the spacing between the lateral outer edges of locking ridges 172. The distance between retention areas 237 of the two fingers is somewhat larger or approximately equal to the distance between the locking ridges 172.

In the unlatched position of retainer 118, locking ridges 172 are positioned in nesting areas 232. To move the retainer 118 into its latched or inward position, it is urged toward the through bore 126. The ramped surfaces 234 contact the locking ridges 172 of bottom support member and spread the legs laterally to cause the locking nubs 236 to surpass the locking ridges 172. The locking ridges 172 align with the retention areas 237 and the locking ridges 172 are captured between the connecting member 224 and the locking nubs 236 releasably retain the retainer 118 when disposed in its inward or locked position.

The retainer beam 219 of the retainer 118 is slidable in guide slot 161. It guides movement of the retainer 118 between its unlatched and latched positions. As illustrated, it is of a length that in the inward or latched position of the retainer 118, its free end 220 is positioned in closely spaced facing relation to the tube 115. It includes an abutment surface that, in the latched position, resides in abutting relation to the surface 191 of upset 190 to prevent withdrawal of male member 114. As can be appreciated, the illustrated retainer 118 is effective to retain the male member 114 within through bore 126 even when the primary retainer 116 is not installed.

Figure 6:
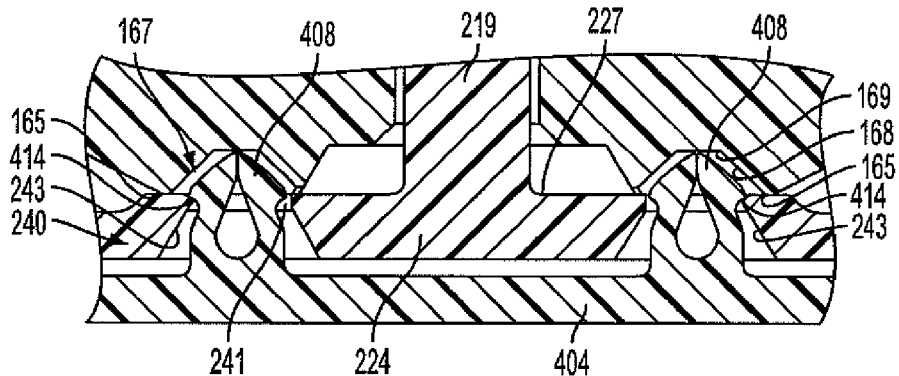
FIG. 6 is a fragmentary sectional view on an enlarged scale of the quick connector coupling as illustrated in FIG. 3 illustrating how the components coact to permit the separation of the indicia element on positioning of the redundant retainer in the latched position.
Figure 7:
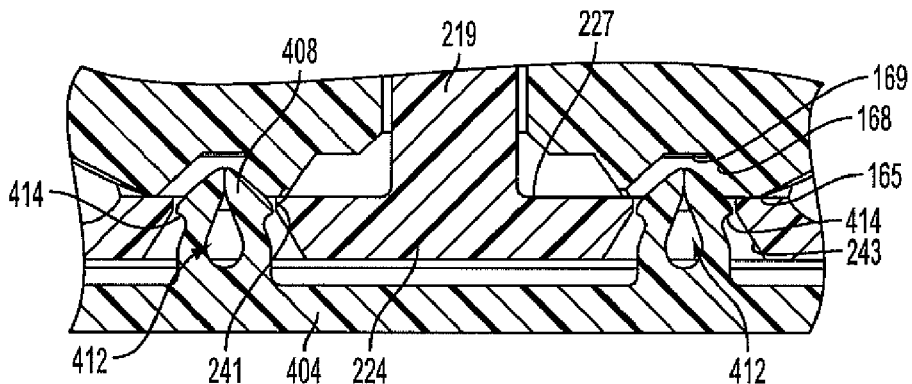
FIG. 7 is a gragmentary sectional view on an enlarged scale of the quick connector coupling as illustrated in FIG. 4 with the redundant retainer in the latched position.

It should be noted that beams 219 need not be configured to provide the retention functions. It is contemplated that in certain applications the beam 219 is of a length that does not extend into through bore 126 sufficiently to radially abut the surface 191 of upset 190. In such instances, beam 219 serves only as a guide for slidable movement of retainer 118. 100421 As best seen in FIGS. 5 to 7, the connecting member 224 of retainer 118 includes two holes or apertures 240 laterally spaced along the connecting member 224. Each aperture 240 is positioned to align with the conical bores 167 provided in bottom wall surface 165 of bottom support members 154. Each aperture 240 includes a cylindrical portion 241 adjacent inner facing surface 227, and it is of a diameter somewhat smaller than the maximum diameter of the conical bores 167 defined by tapered walls 168 in bottom support members 154. The remainder of each aperture 240 is defined by conical surfaces 243 that diverge from cylindrical portions 241.

Figure 8:
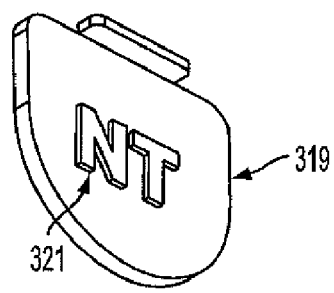
FIG. 8 is a perspective view of a modified form of the separable indicia element.

The retainer 118 includes a separable indicia element in the form of pull ring 119. The pull ring 119 includes a base 404 and a ring portion 406 defining a central grasping aperture. The indicia element is preferably molded from plastic. Of course, it need not be in the form of a ring. It could take many forms, for example as illustrated in FIG. 8, it could be a solid molded tag 319, with other tactile information 320 molded on its surface. Such tactile information is, of course, optional.

A pair of posts 408 extend from the base 404 in the direction opposite the ring portion 406. The posts are generally cylindrical and are spaced apart such that their centers are aligned with the centers of apertures 240 in connecting member 224 and conical bores 167 in bottom wall surfaces 165 of support members 154.

The free ends of the posts 408 define tapered knobs 410 having a base diameter larger than the cylindrical portions 241 holes 240 in connecting member 224. The free ends include a slot 412 which is longer than the length of the knobs 410 and which permits the knob portions of each post to deform radially toward each other in radial compression.

The knobs 410 include a radial latch surface 414 spaced from base 404 at a distance slightly exceeding the thickness of connecting member 224. With indicia element 119 attached to the connecting member 224, the latching surfaces 414 contact the inward facing surface 227 of connecting member 224 to releasably connect indicia element 119 to retainer 118. The knobs 410 taper conically in a direction away from base 404 to a free end 415. The conical surface 416 of each post 408 is formed at an angle somewhat greater than the angle of tapered walls 168 of bores 167 in bottom wall surfaces 165 of bottom support members 154. The axial length of the knobs between the latching surface 414 and the free ends 415 is longer than the depth of bores 167 to bottom surfaces 169. When the locking knobs 410 enter the bores 167, the tapered walls 168 urge the split knob portions together, closing the width of the slots 412. Such closure is sufficient to cause the outer perimeter about the knobs 410 at latching surfaces 414 to reduce in size to permit the knobs 410 to enter the cylindrical portions 241 of holes 240 in connecting member 224. The latching surfaces 414 are no longer in contact with the inward facing surface 227 of connector member 224 and the posts 408 may be withdrawn from the connecting member. Diverging conical surfaces 243 ease the passage of the knobs 410 out of apertures 240.

FIGS. 3-5 illustrate the operation of the separable indicia element 119 of the quick connector coupling 110. For clarity, the primary retainer 116 is not shown. The position it normally occupies is with legs 196 disposed in top slots 158, cross member 198 overlying arcuate top support member 144, and latches 206 engaged with center support members 1 50. Though not essential to the disclosure in this illustrated embodiment, retainer beam 219 on retainer 118, provides releasably latched connection of male member 114 to connector body 112 even without the primary retainer 116.

In certain applications, the quick connector coupling embodying the principles of the present disclosure may include a beam such as beam 219 which provides only guidance for the sliding movement of retainer 118.

Referring to FIGS. 3-6, retainer 118 is shown with separable indicia element 119 attached to connecting member 224. The retainer 118 is in the unlatched position. Posts 408 are disposed in apertures 240 with latching surfaces 414 overlying inward facing surface 227 of connecting member 224, releasably securing indicia element 119 to retainer 118. Note that the conical surfaces 416 of posts 408 are aligned with tapered walls 168 of bores 167 in bottom wall surfaces 165 of bottom support members 254.

In the position illustrated in FIG. 3, the tube 115 is not present within through bore 126. Hence, body post edges 258 contact parabolic body posts 152 to maintain retainer 118 in the unlatched position.

Locking ridges 172 of bottom support members 154 reside in nesting areas 232 defined by ramped surfaces 234 of resilient fingers 222. Note also that in this position, retainer beam 219 does not extend into through bore 126.

FIG. 4 illustrates the retainer 118 in its locked position. Male member 114 is inserted into the body 112 through bore 126. On insertion of male member 114, recognition tabs 242 of extension beams 223 are contacted by upset 190 causing body post edges 258 to disengage from parabolic posts 152 and permit the tabs to move beyond posts 152.

Retainer 118 is moved to its latched position. The locking ridges 172 are positioned in retention areas 237 defined by fingers 222. Free end 220 of retainer beam 219 is disposed in closely spaced relation with tube 115. It extends sufficiently into through bore 126 to place the abutment surface of beam 219 in abutting relation with radial abutment surface 191 of upset 190 to releasably retain the male member 114 in the through bore 126.

Free ends 415 of posts 408 contact tapered walls 168 within bores 167 in bottom walls 165 of bottom support members 154. Knobs 410 are compressed by the coaction between tapered walls 168 and conical surfaces 416. The free ends 415 of posts 408 contact bottom surface 169 of bores 167 in bottom support members 154 before inward facing surface 227 of connecting member 224 contacts bottom wall surfaces 165. Inward movement causes the ends of knobs 410 adjacent latching surfaces 414 to enter cylindrical portions 241 of apertures 240 in connecting member 224 to disconnect the latching surfaces from the inward facing surface 227 of connecting member 224. Resilience of the posts 408 and the conical surfaces 416 of the knobs coact with diverging conical surfaces 243 in aperture 240 to urge the posts, and consequently the indicia element 119, away from connecting member 224. The ring portion 406 may be manually grasped and the indicia element 119 easily removed from the retainer 118.

It should be noted that in the event the separable indicia element 119 is inadvertently dislodged from connecting member 224, it may be reattached. The knobs 410 are simply inserted into apertures 240 and urged into the apertures until the latching surfaces 414 surpass the inward facing surface 227 of connecting member 224. Moreover, even though a pair of posts 408 is shown, it can be appreciated a single post 408 cooperating with a single aperture 240 may be used to interconnect the separable indicia element 119 with the connecting member 224.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A quick connector coupling for use with a fluid line, comprising:
a connector body defining a through bore, which extends from a male reception end of said connector body, the connector body adapted to operably receive a male member extending through said male reception end of said connector body into said bore;
a retainer releasably coupled to said connector body to releasably secure the male member to said body when said retainer is in a latched position, said retainer being adapted to be movable relative to said connector body from an unlatched position to said latched position only when the male member is fully inserted into said body;
a separable indicia element releasably engaged to said retainer, wherein said separable indicia element is removable from said retainer only when said retainer is in said latched position;
said quick connector coupling further comprising:
two fingers defined on said retainer, each of said two fingers defining a retention area;
two locking ridges defined on said connector body, wherein said two locking ridges capture said two fingers when said retainer is in said latched position;
a connecting member defined on said retainer and interconnecting said two fingers, said connecting member having at least one aperture formed therein;
a base defined on said separable indicia element having at least one post extending therefrom, said post including at least one knob at an end thereof;
wherein said at least one post is disposed within said at least one aperture of said connecting member when said retainer is engaged with said separable indicia element;
a radial latch surface formed around at least a portion of said at least one knob and engaging a portion of said connecting member around said at least one aperture when said retainer is engaged with said separable indicia element.

2. The quick connector coupling of claim 1, wherein said at least one post includes two knobs at said end thereof, and a slot defined between said two knobs, and wherein said two knobs are urged together into said slot during insertion of said post into said aperture.

3. The quick connector coupling of claim 1, wherein said connector body defines at least one conical bore having a tapered wall in aligned relationship with said aperture and said at least one post, wherein a conical surface is formed at the end of each of said knobs, and wherein said tapered wall engages said conical surfaces of said at least one knob when said retainer is in said latched position, wherein said engagement between said tapered wall and said at least one knob deforms said at least one post and moves said at least one knob into said slot such that said radial latch surface disengages said portion of said connecting member to release said engagement between said separable indicia element and said connecting member of said retainer.

4. The quick connector of claim 1, wherein said at least one aperture formed in said connecting member includes a tapered entry portion having a generally conical shape, and a cylindrical guide portion disposed adjacent said conical portion and defining said perimeter of said aperture, and wherein said tapered entry portion is arranged to urge said knob away from said perimeter of said aperture during insertion of said post into said aperture.

5. The quick connector of claim 1, wherein said separable indicia element is a ring having a base in contact when said retainer when said retainer is engaged with said separable indicia element.

6. The quick connector of claim 1, further comprising a male member extending through said male member reception end, a primary retainer adapted to releasably secure said male member within said connector body, said primary retainer including a pair of spaced apart legs movable between a locked position and a released position in which the spacing between said legs is increased.

7. The quick connector of claim 6, wherein said male member has a generally cylindrical sealing surface and an annular upset, said upset having a diameter greater than a diameter of said sealing surface, wherein said retainer is movable between said unlatched position and said latched position when said annular upset of said male member is disposed in contact with at least one recognition tab of said retainer.

8. A quick connector coupling for use with a fluid line, comprising:
a connector body defining a through bore, which extends from a male member reception end of said connector body, the connector body adapted to operably receive a male member extending through said male member reception end of said connector body into said bore;
a retainer releasably coupled to said connector body to releasably secure the male member to said body when said retainer is in a latched position, said retainer being adapted to be movable relative to said connector body from an unlatched position to said latched position only when the male member is fully inserted into said body;
a separable indicia element releasably engaged to said retainer, wherein said separable indicia element is removable from said retainer only when said retainer is in said latched position,
said quick connector coupling further comprising:
at least one finger defined on said retainer;
at least one retention area defined on said at least one finger; and
at least one locking ridge defined on said connector body;
wherein said locking ridge captures said at least one finger by engaging said at least one retention area when said retainer is in said latched position;
wherein said male member has a generally cylindrical sealing surface and an annular upset, said upset having a diameter greater than a diameter of said sealing surface, wherein said retainer is movable between said unlached position and said latched position when said annular upset of said male member is disposed in contact with at least one recognition tab associated with said retainer;
wherein said retainer further includes a retainer beam slidable in a slot defined in said connector body, and wherein said retainer beam is of a length adequate to engage a portion of said upset to secure said male member into said connector body when said retainer is in said latched position, and at least one extension beam connecting said recognition tab to said at least one finger.

9. A quick connector coupling for forming a fluid connection between first and second fluid lines, the first fluid line being connected to a first end of a connector body of the quick connector coupling, and the second line including a tubular male member forming a cylindrical sealing surface at one end, a radially extending upset adjacent the cylindrical sealing surface, and having an outer diameter that is larger than an outer diameter of the cylindrical sealing surface, the quick connector coupling comprising:
a through bore formed in the connector body and extending from a male reception end thereof, the connector body adapted to operably engage the male member extending through said male reception end of said connector body into said bore;
two locking ridges defined on said connector body;
a primary retainer adapted to releasably secure said second fluid line within said connector body, said primary retainer including a pair of spaced apart legs movable between a locked position and a released position in which the spacing between said legs is increased;
a secondary retainer releasably coupled to said connector body, said secondary retainer including spaced apart fingers, each finger having a verifying tab associated therewith and a retention area, said secondary retainer being movable relative to said connector body between an unlatched position and a latched position, wherein said secondary retainer is adapted to be moveable to said latched position only when said upset is in contact with said verifying tabs, and wherein said two retention areas are adapted to capture said locking ridges when said secondary retainer is in said latched position;
a separable indicia element releasably engaged to said secondary retainer, wherein said separable indicia element is removable from said secondary retainer when said secondary retainer is in said latched position;
said quick connector coupling further comprising:
a connecting member defined on said secondary retainer and interconnecting said spaced apart fingers, said connecting member having at least one aperture formed therein;
a base defined on said separable indicia element having at least one post extending therefrom, said post including at least one knob at an end thereof;
wherein said at least one post is disposed within said at least one aperture of said connecting member when said secondary retainer is engaged with said separable indicia element; and
a radial latch surface formed around at least a portion of said at least one knob and engaging a portion of said connecting member around said at least one aperture when said secondary retainer is engaged with said separable indicia element.

10. The quick connector coupling of claim 9, further comprising:
a conical bore having a tapered wall formed in said connector body in aligned relationship with said aperture and said at least one post, said conical bore disposed adjacent said connecting member when said secondary retainer is in said latched position;

wherein said tapered wall engages said at least one knob of said at least one post when said secondary retainer is in said latched position, wherein said engagement between said tapered wall and said at least one post deforms said post and moves said knob such that said radial latch surface disengages said portion of said connecting member to release said engagement between said separable indicia element and said connecting member of said secondary retainer when said secondary retainer is in said latched position.

11. The quick connector of claim 9, wherein said separable indicia element is a ring having a base in contact with said secondary retainer when said secondary retainer is engaged with said separable indicia element.

12. The quick connector of claim 9, wherein said secondary retainer is movable between said unlatched position and said latched position when said upset of said second fluid line is disposed between said verifying tabs.

13. A quick connector coupling for forming a fluid connection between first and second fluid lines, the first fluid line being connected to a first end of a connector body of the quick connector coupling, and the second line including a tubular male member forming a cylindrical sealing surface at one end, a radially extending upset adjacent the cylindrical sealing surface, and having an outer diameter that is larger than an outer diameter of the cylindrical sealing surface, the quick connector coupling comprising:

a through bore formed in the connector body and extending from a male reception end thereof, the connector body adapted to operably engage the male member extending through said male reception end of said connector body into said bore;

two locking ridges defined on said connector body;

a primary retainer adapted to releasably secure said second fluid line within said connector body, said primary retainer including a pair of spaced apart legs movable between a locked position and a released position in which the spacing between said legs is increased;

a secondary retainer releasably coupled to said connector body, said secondary retainer including spaced apart fingers, each finger having a verifying tab associated therewith and a retention area, said retainer being movable relative to said connector body between an unlatched position and a latched position, wherein said retainer is adapted to be moveable to said latched position only when said upset is in contact with said verifying tabs, and wherein said two retention areas are adapted to capture said locking ridges when said retainer is in said latched position, a separable indicia element releasably engaged to said secondary retainer, wherein said separable indicia element is removable from said secondary retainer when said secondary retainer is in said latched position;

and wherein said secondary retainer further includes a retainer beam slidable in a slot defined in said connector body, and wherein said retainer beam is of a length adequate to engage a portion of said upset to secure said male member into said connector body when said secondary retainer is in said latched position.

* * * * *

UNITED STATES PATENT AND TRADEMARK OFFICE
CERTIFICATE OF CORRECTION

PATENT NO. : 8,240,716 B2
APPLICATION NO. : 12/534418
DATED : August 14, 2012
INVENTOR(S) : Jim Kerin and Richard M. Pepe It is certified that error appears in the above-identified patent and that said Letters Patent is hereby corrected as shown below:

On the title page, please correct the following:

(73) Assignee should read: TI Group Automotive Systems, LLC

Claim 5,
Line 20, change "when" to "with"

Claim 8,
Line 66, change "unlached" to "unlatched"

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

PATENT NO.         : 8,240,716 B2                          Page 1 of 1
APPLICATION NO.    : 12/534418
DATED              : August 14, 2012
INVENTOR(S)        : Jim Kerin and Richard M. Pepe It is certified that error appears in the above-identified patent and that said Letters Patent is hereby corrected as shown below:

On the title page, please correct the following:

(73) Assignee should read: TI Group Automotive Systems, LLC

Column 9, line 20 (claim 5, line 2) change "when" to "with"

Column 9, line 66 (claim 8, line 29) change "unlached" to "unlatched"

This certificate supersedes the Certificate of Correction issued October 2, 2012.

Signed and Sealed this
Sixth Day of November, 2012

David J. Kappos
*Director of the United States Patent and Trademark Office*